| United States Patent [19] | [11] | 4,012,556 |
|---|---|---|
| Keske et al. | [45] | Mar. 15, 1977 |

[54] SELF-BONDING VARNISH FOR MAGNET WIRES COMPRISING A POLYALKYLENETRIMELLITATE ESTER IMIDE

[75] Inventors: Robert G. Keske; James R. Stephens, both of Naperville, Ill.

[73] Assignee: Standard Oil Company (Indiana), Chicago, Ill.

[22] Filed: Feb. 23, 1976

[21] Appl. No.: 660,716

[52] U.S. Cl. .............................. 428/383; 260/75 N; 260/326 R; 427/116; 427/118; 427/120; 428/377; 428/379; 428/458
[51] Int. Cl.[2] .................. B32B 15/08; C07D 29/34; C08G 78/16; H01B 3/30
[58] Field of Search .......... 428/379, 383, 458, 377; 260/75 N, 326 R; 427/116, 117, 118, 120

[56] References Cited

UNITED STATES PATENTS

| 3,668,715 | 6/1972 | Sattler | 260/75 N |
| 3,697,471 | 10/1972 | Schmidt et al. | 260/75 N |
| 3,852,246 | 12/1974 | Schmidt et al. | 260/75 N |
| 3,880,812 | 4/1975 | Golinkin et al. | 260/75 N |
| 3,917,892 | 11/1975 | Kawogueki et al. | 428/383 |
| 3,944,706 | 3/1976 | Czajka | 428/458 |

*Primary Examiner*—J.C. Cannon
*Attorney, Agent, or Firm*—William H. Magidson; Arthur G. Gilkes; William T. McClain

[57] ABSTRACT

Magnet Wire Bearing a Self-Bonding Poly(alkylenetrimellitate ester imide) varnish coating which is capable of forming a unitary structure after producing a fabricated article from the coated wire wherein the varnish layer bonds on heating.

11 Claims, No Drawings

SELF-BONDING VARNISH FOR MAGNET WIRES COMPRISING A POLYALKYLENETRIMELLITATE ESTER IMIDE

This invention relates to wire bearing a self-bonding varnish coating. More particular, this invention relates to magnet wire bearing a self-bonding poly(alkylenetrimellitate ester imide) coatings.

Magnet wire is an essential element of many electrical components, such as armatures, stators, coils, etc. Typically, the bare magnet wire is insulated by coating with one or more layers of a magnet wire enamel. N.E.M.A. standards require that the insulating enamel layer must be flexible and thermally stable under the conditions of use and that the coated wire must have specific mechanical properties. The thermal rating of magnet wire enamels is normally determined by ASTM D-2307 (1968). Magnet wire components used in small appliances and under the hood of automobiles generally require relatively high thermal ratings and correspondingly the most expensive enamels. Accordingly, various types of enamels are employed depending upon the thermal properties required by the end use. The enameled magnet wire is fabricated into the desired electrical component, dipped into a varnish and the varnish heat fused. The varnish is necessary to hold the wound magnet wire in place in the electrical component and enhances to some extent the insulating value of the finished component.

There has been considerable interest in avoiding the relatively time consuming varnish dipping step. Accordingly, industry would like self-bonding magnet wire varnishes where (1) the varnish can be applied directly to the unwound enameled magnet wire, (2) the varnish layer provides a tack-free top coating on the enameled wire which maintains its integrity during fabrication (winding, assembly, etc.), (3) the varnished wire passes the N.E.M.A. standards for enameled wire and (4) the varnish layer can be heat fused after fabrication to form essentially the same unitary electrical components as the prior art process. The advantage of a self-bonding varnish is apparent when one considers the speed at which the wire can be coated with varnish as opposed to dipping and handling numerous fabricated parts.

Self-bonding epoxy varnishes have been developed. However, these epoxy varnishes are limited to end uses having a rating of 130° C or below. Above about 130° C, the epoxy breaks down. In commonly assigned application Ser. No. 493,558 of Czajka, filed Aug. 8, 1974, and now U.S. Pat. No. 3,944,706, poly(ethylenetrimellitate imides) are disclosed as suitable self-bonding magnet wire varnishes for class 155 rated (class F) enamels or higher rated enamels. While the poly(ethylenetrimellitate imide) varnishes of Czajka have excellent properties, the coatings have a tendency to craze on elongation of the coated wire. Further, there has been some interest in top coat varnishes similar to the Czajka polymers which bond to a unitary structure at somewhat lower temperature. Accordingly, there is a need for other self-bonding varnishes for the polyester enamels, which have a class F rating (155° C), polyester or polyester-imide enamels, which have a class H rating (180° C) and for the polyimide and polyamideimide enamels, which have a 220° C rating. These enamels other than those described above presently require that the fabricated element be dipped into a suitable varnish prior to heat curing.

The general object of this invention is to provide a new magnet wiring bearing a continuous self-bonding varnish top coat. A more specific object is to provide magnet wire bearing a self-bonding varnish top coat for polyester, polyesterimide, polyimide and polyamideimide enamel subbing layers. Other objects appear hereinafter.

We have now found that the objects of this invention can be attained by employing poly(alkylenetrimellitate ester imides) having an I.V. (Inherent Viscosity) of at least 0.3 dl/g as a top coat varnish. The poly(alkylenetrimellitate ester imides) have excellent thermal properties, can be applied directly to enameled or subbed magnet wire and dry to a non-tacky coating without aesthetically undesirable crazing. The poly(alkylenetrimellitate ester imide) coated magnet wire passes the N.E.M.A. standards and the varnish bonds on heating the fabricated elements to the desired unitary structure. For simplicity the articles of this invention can be viewed as magnet wire bearing a self-bonding top coat varnish comprising a poly(alkylenetrimellitate ester imide). However, the magnet wire usually comprises one or more layers of one or more relatively thermally stable subbing layers, such as one or more polyester, polyimide, polyesterimide or polyamideimide subbing layers.

The poly(alkylenetrimellitate ester imides) useful in this invention can be represented by the repeating unit

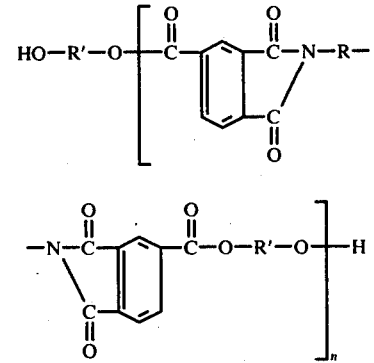

wherein R and R' are independently one or more alkylene groups of 2 to 12 carbon atoms (ethylene, propylene, dodecamethylene, etc.) and $n$ is a number sufficient to provide a polymer having an I.V. of at least 0.3 dl/g.

For the purpose of this invention, the inherent viscosity is measured at 25° C and 0.5% W/v in 60/40 w/w phenol/1,1,2,2-tetrachloroethane.

The poly(alkylenetrimellitate ester imides) of this invention have an I.V. (inherent viscosity) of at least 0.3 dl/g, preferably at least 0.4 dl/g. If the I.V. is below 0.3, the coating lacks the desired physical properties and the varnished magnet wire cannot be processed easily.

In general, the poly(alkylenetrimellitate ester imides) can be produced by reacting a trimellitic acid compound (trimellitic anhydride or trimellitic acid) with one or more aliphatic diprimary amines and one or more aliphatic glycols. The aliphatic glycol component and aliphatic amine component should each be used in a concentration of at least one half-mole per mole of trimellitic acid compound. In general, it is preferable to use an excess of glycol over theoretical since the vicinal acyl groups of the trimellitic acid compound react preferentially with the primary amino groups to form imide groups and any excess primary amino groups react with the non-vicinal carboxylic acid groups of the trimellitic acid compound in competition with the hydroxy group of the aliphatic glycol. If excess diamine is used, an amide-imide ester-imide copolymer is formed. Accordingly, the particular mole ratios of these reactants are not critical to the production of the desired poly(alkylenetrimellitate ester imides) provided there is approximately a 1:2 mole ratio of diamine to trimellitic acid compound. All of the reactants can be condensed simultaneously at about 90° to 290° C. and the unreacted glycol and diamine distilled off. If desired, the bis-imide can be formed in the first step as described in Bolton et al. U.S. Pat. No. 3,051,724, which is incorporated by reference, and glycol reacted with the bis-imide at 90° to 290° C. In order to maintain the reactants in a fluid condition, it is usually desirable to carry out the reaction in the presence of a tertiary amine, such as triethyl amine or tripropyl amine. In any case, the reaction is terminated after the polymer reaches an I.V. of at least 0.3, preferably 0.4, provided the condensation system permits attainment of the desired I.V.

The reaction can be carried out in the presence of a suitable esterification catalyst such as antimony trioxide, antimony tributoxide, tetrabutyl titanate, tetra-isopropyl titanate, stannous salts, such as stannous laurate and various organotin compounds, such as dibutyltin maleate, dibutyltin dilaurate, dibutyltin diacetate, tributyltin adipate, dibutyltin salicylate, dibutyltin dichloride, etc. All of these catalysts can be used in concentration of about 0.01 to 2 parts by weight (preferably 0.1 to 0.5 parts by weight) per 100 parts by weight of the reactants.

The aliphatic glycols useful in this invention include ethylene glycol, 1,2-propylene glycol, trimethylene glycol, tetramethylene glycol, dodecamethylene glycol, etc. Of these, ethylene glycol is preferred since is provides polymers having a somewhat harder finish. Further, in view of its lower molecular weight, excess ethylene glycol can be removed from the reaction mixture more readily than the higher molecular weight glycols as the reaction is completed. Other things being equal, the more carbon atoms in the alkylene glycol the lower the cure temperature of the polymer and the lower the N.E.M.A. rating of the polymer.

The aliphatic diprimary amines useful in this invention include ethylene diamine, 1,2-diamino propane, 1,3-diamino propane, 1,4-diamino butane, 1,6-diamino hexane, 1,12-diamino dodecane, etc. Of these, ethylene diamine is preferred since other things being equal as the chain length of the diamine increases, the melting point of the polymer decreases, the heat fusion temperature of the polymer decreases and the N.E.M.A. rating of the polymer decreases. However, ethylene diamine/ethylene glycol products attain maximum bonding strength at a temperature somewhat higher than polyethylenetrimellitate imide.

If desired two or more glycols and/or diamines can be used to vary the physical properties of the polymers.

For use with magnet wire enamels having the highest N.E.M.A. ratings, it is usually preferred to utilize ethylene glycol and ethylene diamine as the sole reactants with trimellitic acid compound.

Substantially any one or more thermally stable magnet wire enamels can be used as subbing layers for the self-bonding poly(alkylenetrimellitate ester imide) top coats. As indicated above, suitable subbing layers include polyesters, polyesterimides, polyamideimides, polyimides, etc.; see for example U.S. Pat. Nos. 3,022,200 of Koerner, et al.; 3,371,009 of Traynor, et al.; 3,428,486 of George; 3,475,212 of Bach, all of which patents are incorporated by reference. A particular useful combination is to employ a polyester layer or layers directly in contact with the magnet wire and higher thermally rated enamels as the outer enamel layer. For example, it is desirable to have a polyester enamel subbing layer in direct contact with the magnet wire and either a polyimide or polyamideimide enamel layer in direct contact with the polyester layer and the poly(alkylenetrimellitate ester imide) top coat. Of course, each of these layers may be formed by one or more applications of the particular polymer.

The thermally stable enamels and the poly(alkylenetrimellitate ester imides) can be applied to magnet wire by passing the wire through the polymer solution, through a suitable die and then through an oven maintained at an elevated temperature to cure and/or dry the resins on the wire. Where desired, the wire may be passed through the polymer solution and dies a number of times and through the oven after each pass through the polymer solution. In this way a thicker polymer buildup is obtainable than can be obtained with only a single pass through a polymer solution. Typically the die provides a clearance of from about 2 to 4 mils around the wire. The speed at which the wire is passed through the polymer solution and the temperature at which the oven is maintained depends upon the particular polymer solution employed, the buildup of polymer desired, the length of the oven in which the coated wire is cured and/or dried and the molecular weight of the polymer used in the coating operation. The various parameters for applying the thermally stable enamels are well known by practitioners in this industry and particularly efficacious combinations of enamels and operating conditions can be determined by routine experimentation.

The self-bonding poly(alkylenetrimellitate ester imides) are preferably applied from a 10 to 30 percent by weight solution of an organic solvent such as cresylic acid or meta-cresol or mixtures of these with xylenes, at a rate of 10 to 1000 feet per minute and dried at a temperature of 250° to 500° C before winding the wire and fabricating the wound magnet wire into the desired electrical component, such as a coil.

After fabrication of the electrical component, the thermoplastic poly(alkylenetrimellitate ester imides) coatings can be bonded together at a temperature of 150° to 300° C or higher for approximately 60 minutes to 5 minutes to form a unitary structure. In general, the higher the fusion temperature the shorter the heating time.

If desired, mixtures of from about 5 to 95 parts by weight of one of the aforesaid poly(alkylenetrimellitate ester imide) and correspondingly 95 to 5 parts by weight of a poly(alkylenetrimellitate imide) described in U.S. Pat. No. 3,880,812 of Golinkin et al, which is incorporated by reference, can be utilized to balance the properties of the varnish top coat. These systems are the subject of Keske application Ser. No. 660,713, filed on even date herewith.

The following examples are merely illustrative.

EXAMPLE 1

Four-hundred forty-two and three tenths grams trimellitic anhydride, 600 grams ethylene glycol, 20 grams triethylamine and one gram dibutyltinmaleate were placed in a two liter-three necked round bottomed flask equipped with a mechanical stirrer, addition funnel and distillation head equipped with a condenser. Seventy grams of ethylene diamine were added to the stirred mixture over a period of 10 minutes. After the exothermic reaction slowed down, the reflux condenser was replaced with a distillation head and condenser and the addition funnel was replaced with a nitrogen sparge tube. The temperature of the heating mantle surrounding the flask was raised to 580° F and a slow bleed of nitrogen was passed through the reactants. While the reactants were heated to 580° F, ethylene glycol, water, etc. were distilled off and the contents of the flask solidified and then slowly dissolved or melted as the distillation progressed. After 582 grams of distillate was removed over 2¼ hours, a clear colored solution was obtained. The solution was stirred with heating for an additional thirty minutes and then 1.0 gram of additional dibutyltinmaleate was added and the solution stirred for an additional fifteen minutes under nitrogen followed by fifteen minutes under vacuum (1.0 mm. Hg). The colored and ground polymer had an inherent viscosity of 0.50 dl/g.

Eighteen gauge (0.0403 in. diameter) copper AWG wire, annealed at 750° F under nitrogen, was coated in a G.E. laboratory Model Type M Wire Tower by passing the annealed wire at 40 to 50 feet per minute through a 30% solids room temperature bath of an ethylene glycol/trishydroxyethyl isocyanurate terephthalate polyester (Isonel 200 XWE 490) in cresylic acid and dried in a two stage 15-foot oven where the first 7½ feet of the oven was maintained at 500° F and the second half of the oven was maintained at 850° F. Four coats of polyester were applied in this manner thereby increasing the wire diameter by 2.2 mils. Two layers of a trimellitic anhydride/methylene bisaniline/methylene bisaniline diisocyanate amideimide polymer of the type described in Hanson et al. Application Ser. No. 348,868 filed Apr. 4, 1973, now U.S. Pat. No. 3,847,878, which is incorporated by reference, were applied in essentially the same manner by passing the polyester coated wire through a 25% solids room temperature bath of the amideimide polymer in a 2:1 weight ratio of N-methyl-pyrrolidone:xylene and dried in the two stage oven at 500° F and 850° F thereby increasing the enamel layer diameter an additional 0.8 mils. Two bond coats of polyethylenetrimellitate ester imide prepared in the preceding paragraph having an I.V. of about 0.50 were applied in essentially the same manner by passing the enameled copper wire through a room temperature 21% solids bath of poly(ethylenetrimellitate ester imide) in meta-cresol at 40 feet per minute and drying at 500° F and 850° F to increase the wire diameter 0.6 to 0.8 mils.

The magnet wire was wound, fused and tested according to N.E.M.A. Magnet Wire Standards MW-1000-1973 except using 225° C as bonding temperature with the results set forth below in Table I:

Table I

| Test | NEMA Spec. | Ex. 1 |
| --- | --- | --- |
| 20% JERK + MANDREL | 3X MAX | 1X |
| SNAP + MANDREL | PASS | 2X |
| BURN OUT, OFM | AT LEAST 6.8 | 8.1 |
| DIELECTRIC STRENGTH | 5700 VOLTS | 12,200 VOLTS |
| UNILATERAL SCRAPE | 1150 grams | 1910 grams |
| BOND STRENGTH IN POUNDS | 9 Min | 12.5 |

The above data illustrates that poly(ethylenetrimellitate ester imide) is an excellent self-bonding top coat varnish.

EXAMPLE 2

This example illustrates the production and use of a polyalkylene trimellitate ester imide based on ethylene glycol and hexamethylene diamine. Six-hundred sixty-three and five-tenths grams trimellitic anhydride, 300 grams ethylene glycol, 100 grams triethylamine and 2 grams dibutyltinmaleate were placed in a three liter-three necked round bottom flask equipped with stirrer, additional funnel and distillation head equipped with condenser. A mixture of 200.3 grams of hexamethylene diamine and 100 grams of ethylene glycol were added to the reaction flask over five minutes. After the exothermic reaction slowed down, the addition funnel was replaced with a nitrogen sparge tube and a slow bleed of nitrogen was passed through the flask while the temperature of the spherical heating mantle surrounding the flask was raised to 560° F. The reactants turned almost solid initially but after 1½ hours of heating and distillation of excess glycol and triethylamine, a clear amber solution formed. A vacuum of 15 inches Hg was drawn on the system for 15 minutes and then the vacuum was reduced to 0.5 mm. Hg for an additional 45 minutes. The cooled ground polymer had an I.V. of 0.5 dl/g.

The magnet wire was coated in the same manner as described in Example 1 except that a 21% solids solution of the polymer prepared in the preceding paragraph in cresylic acid/xylene (4:1 weight ratio of cosolvents) was applied. The magnet wire was wound and fused at four temperatures (160° C, 180° C, 200° C, and 220° C.) The bond strength of the bonded elements (tested at room temperature) were as follows: 13.4 pounds at 160° C cure temperature, 22.1 pounds at 180° C cure temperature, 19.8 pounds at 200° C cure temperature and 26.1 pounds at 220° C. The bonded elements had a 1X 20% Jerk + mandrel, 2X snap + mandrel, 6.5 OFM burn out, and a dielectric strength of 10,900 volts.

The above data illustrates that the polyalkylenetrimellitate ester imides of this invention can be used as self-bonding varnishes for magnet wire.

We claim:
1. Magnet wire bearing a continuous self-bonding varnish top coat comprising a poly(alkylenetrimellitate ester imide) having an I.V. of at least 0.3 dl/g of the structure

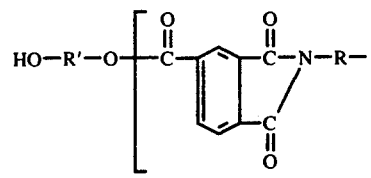

-continued

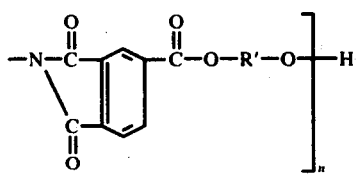

wherein each R and each R' is independently an alkylene group of 2–12 carbon atoms and $n$ is a number sufficient to provide a polymer having an I.V. of at least 0.3 dl/g.

2. The article of claim 1 wherein said poly(alkylenetrimellitate ester imide) has an I.V. of at least 0.4 dl/g.

3. The article of claim 1, wherein R' is ethylene.

4. The article of claim 3 wherein R is ethylene.

5. The article of claim 3 wherein R is hexamethylene.

6. The article of claim 1, wherein said magnet wire bears at least one enamel subbing layer selected from the group consisting of a polyester, polyesterimide, polyimide and polyamideimide.

7. The article of claim 6 wherein a polyester enamel subbing layer is in direct contact with the magnet wire.

8. The article of claim 7 wherein a polyamideimide enamel subbing layer is in direct contact with the polyester subbing layer and poly(alkylenetrimellitate ester imide) top coat.

9. The article of claim 7, wherein a polyimide enamel subbing layer is in direct contact with the polyester subbing layer and poly(alkylenetrimellitate ester imide) top coat.

10. The article of claim 1 wherein the magnet wire is in a fabricated unbonded form.

11. The method of converting the article of claim 10 into a unitary structure, which comprises bonding the fabricated element at a temperature of 150°–300° C.

* * * * *